(12) United States Patent
Saint Esteben et al.

(10) Patent No.: US 12,373,187 B2
(45) Date of Patent: Jul. 29, 2025

(54) AUTOMATIC MICROGATEWAY TAXONOMY TAGS

(71) Applicant: Salesforce, Inc., San Francisco, CA (US)

(72) Inventors: Diego Saint Esteben, Buenos Aires (AR); Ignacio Manzano, Buenos Aires (AR); Daniel Fujii, Buenos Aires (AR); Ignacio Raik, Buenos Aires (AR); Mariano Mirabelli, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 511 days.

(21) Appl. No.: 17/587,512

(22) Filed: Jan. 28, 2022

(65) Prior Publication Data

US 2023/0085848 A1    Mar. 23, 2023

Related U.S. Application Data

(60) Provisional application No. 63/246,137, filed on Sep. 20, 2021.

(51) Int. Cl.
*G06F 21/62*    (2013.01)
*G06F 8/10*    (2018.01)
(Continued)

(52) U.S. Cl.
CPC ................. *G06F 8/65* (2013.01); *G06F 8/10* (2013.01); *G06F 8/36* (2013.01); *G06F 8/423* (2013.01);
(Continued)

(58) Field of Classification Search
CPC ........ G06F 21/6218; G06F 8/73; G06F 8/423; G06F 8/65; G06F 8/10; G06F 9/541;
(Continued)

(56) References Cited

U.S. PATENT DOCUMENTS

| | | | | |
|---|---|---|---|---|
| 2015/0128156 A1* | 5/2015 | Zhu | ........................ | G06N 5/045 |
| | | | | 719/328 |
| 2022/0035689 A1* | 2/2022 | Raheja | .................. | G06F 9/5011 |
| 2022/0343250 A1* | 10/2022 | Tremblay | ........... | G06Q 10/0633 |

FOREIGN PATENT DOCUMENTS

| | | | | |
|---|---|---|---|---|
| CN | 108351828 A | * | 7/2018 | .......... G06F 11/3664 |
| CN | 115328758 A | * | 11/2022 | |

* cited by examiner

*Primary Examiner* — Alexander Lagor
*Assistant Examiner* — Shu Chun Gao
(74) *Attorney, Agent, or Firm* — Sterne, Kessler, Goldstein & Fox P.L.L.C.

(57) ABSTRACT

Disclosed herein are system, method, and computer program product embodiments for implementing automatic taxonomy tags in an API microgateway. The API microgateway may receive a plurality of API requests for an API managed by a customer in a period of time and route the plurality of API request to an instance of the API according to a policy of the API. The API microgateway may aggregate metrics information related to the plurality of API requests. The aggregated metrics information may include request features, response features, policy features, and performance features. In response to a cluster of the metrics information corresponding to a tag in a tag prediction system, the aggregated metrics information may be labeled with the tag. The tag and the aggregated metrics information may be added to an access log and sent to the customer.

20 Claims, 8 Drawing Sheets

(51) Int. Cl.
  *G06F 8/36*    (2018.01)
  *G06F 8/41*    (2018.01)
  *G06F 8/65*    (2018.01)
  *G06F 8/71*    (2018.01)
  *G06F 9/54*    (2006.01)
  *H04L 9/40*    (2022.01)
  *H04L 47/22*    (2022.01)

(52) U.S. Cl.
  CPC ................ *G06F 8/457* (2013.01); *G06F 8/71* (2013.01); *G06F 9/541* (2013.01); *G06F 9/547* (2013.01); *G06F 21/6218* (2013.01); *H04L 47/22* (2013.01); *H04L 63/029* (2013.01); *H04L 63/1458* (2013.01); *H04L 63/20* (2013.01)

(58) Field of Classification Search
  CPC ... G06F 8/71; G06F 9/547; G06F 8/36; G06F 8/457; H04L 63/1458; H04L 63/029; H04L 63/20
  See application file for complete search history.

AUTOMATIC MICROGATEWAY TAXONOMY TAGS

CROSS-REFERENCE TO RELATED APPLICATIONS

This application claims the benefit of U.S. Provisional Patent Application No. 63/246,137 by Bispo, et al., titled "Enterprise Management Functionality in an Application Programming Interface Gateway," filed on Sep. 20, 2021, which is incorporated by reference herein in its entirety.

BACKGROUND

One or more implementations relate to the field of Application Programming Interfaces (APIs), and more specifically to automatic microgateway taxonomy tags.

As connectivity between computer and mobile devices continues to develop, applications have been developed to communicate and share information. Commonly, applications may communicate via an Application Programming Interface (API). An API is a software interface offering a service to other programs to communicate data. APIs may have several different components, such as specifications, markdown documents, etc. that constitute part of an API's development. As APIs continue to be developed and utilized, many large enterprise organizations may develop or implement dozens or even hundreds of APIs.

As organizations go through the digital transformation and unlock information through the use of APIs, organizations rely on API management products to route their API requests, aggregate API responses, enforce service level agreements, and monitor the process of API requests. These API management products place small memory footprint gateways (microgateways) in front of their APIs and allow a comprehension of the status of the APIs. The API management products can capture metrics information for the API requests and send the metrics information to a monitoring system. However, the metrics information for the API requests may be insufficient for organizations to quickly identify issues during processing the API requests. For example, a higher response time for the API requests or an increase in the number of API requests may not be enough to determine that there is a security attack.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
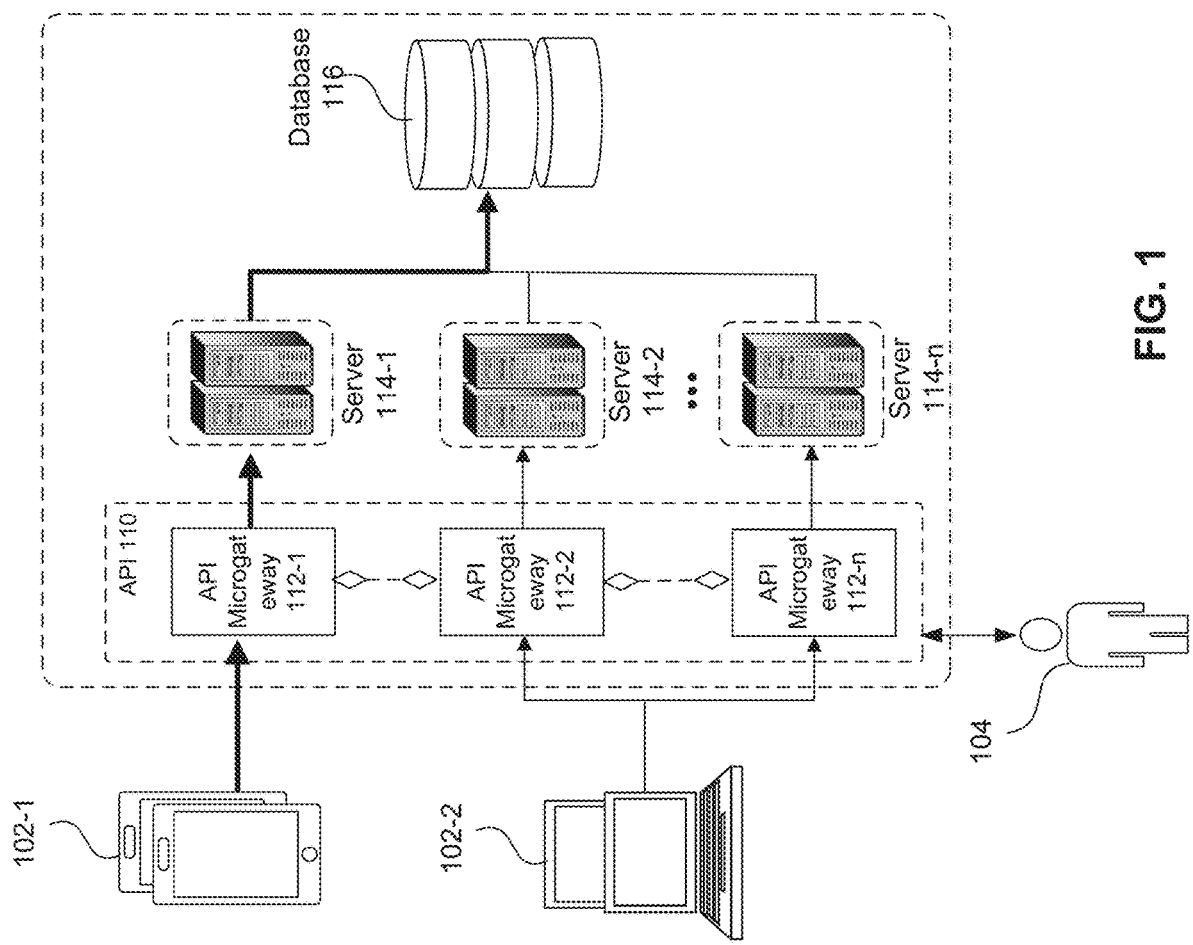
FIG. 1 illustrates a block diagram of an exemplary environment for implementing automatic microgateway taxonomy tags, in accordance with some embodiments.

Provided herein are system, apparatus, device, method and/or computer program product embodiments, and/or combinations and sub-combinations thereof, for implementing automatic microgateway taxonomy tags.

An API is associated with an endpoint, i.e., a resource (often represented as a unique URL) that may accept API requests to the services provided by the particular API. APIs provide an addition level of security for both the client/requestor and server/responder because limited types of communications transmit between the client and server, obviating the need for any party to fully expose its data. An API can have multiple instances in various environments to process the API requests.

An API gateway authenticates and routes API requests and enforces rate limiting, throttling, and other service level agreements to protect the healthiness of the API and ensure that every internal component (servers, databases, etc) has capacity to serve the API requests. API gateways point to the backend APIs and services that a service provider defines, and abstracts them into a layer that can be regulated by an API management solution. The API gateway protects an organization's data by implementing encryption and access control. An API gateway uses "policies" to enforce regulations related to security, traffic control, authentication, access, and service level access. Generally speaking, a policy configures the desired behavior of the API gateway across a range of behaviors. The policy may be represented in YAML, JSON, or other suitable human-readable and machine interpretable format. An API microgateway is a lightweight, distributed API gateway that is designed to enforce policies and business logic at or near the backend APIs.

A typical implementation available in the microgateway is a "rate limiting policy", which defines how many requests an instance of API will allow in a specific period of time, for example: "for the Orders API, allow only 1000 requests every minute." Different instances of API can have different rate limiting policies. For example, API instance 1 can have a rate limiting policy of 1000 requests per minute and API instance 2 can have a rate limiting policy of only 100 requests per minute. The microgateway routes the requests for the API to different instances according to their rate limiting policies. The microgateway also aggregate metrics information from multiple API instances of the API and add the metrics information into access log messages. An administrator can monitor the log messages and identify issues during the processing of the API requests. For example, when API instance 2 receives more than 100 requests per minute, a violation of its rate limiting policy, the administrator can identify the policy violation in the log messages and take actions to respond to the policy violation. However, a policy violation may not indicate an issue of the API or the microgateway. The administrator may need additional information, such as API requests response time, CPU utilization, and memory utilization, to determine if the API has a denial-of-service (DoS) attack, or the rate limiting policy for API instance 2 needs update, or the microgateway is misconfigured. As the metrics information can include a large number of metrics and different clustering of the metrics may indicate different issues, the administrator may not be able to identify the issue in a short time.

Additionally, time is essential when an issue arises because a quick response to the issue (e.g., isolation of the API instance under a DoS attack) may mitigate damage. In legacy systems where the administrator determine whether an issue exists, the administrator must monitor the metrics information in the log messages, analyze the system with a database, and then take an appropriate action to solve the issue. Precious time is lost. This may translate into lost revenue and decreased goodwill among users.

No legacy technique or system provides a solution to automatically identify the issue and tagging the metrics information to improve this issue identification process during processing of API requests. Accordingly, a need exists to improving the API microgateway by aggregating the metrics information and automatically tagging the metrics information during processing of API requests. With automatic microgateway taxonomy tags, the metrics information in the access log can be automatically tagged based on a cluster of the metrics information. For example, the microgateway can aggregate the metrics information during processing of API requests in a period of time. If the metrics information includes a policy violation for quality of service (QoS), a memory usage of 80%, and a CPU usage of 90%, the microgateway can automatically label the metrics information with a tag of DoS attack based on a machine learning clustering model. The tag can provide insight for the administrator monitoring the API and API microgateway. The administer can isolate the API instance under the DoS attack and mitigate the damage to the server running the API instance and the damage to other APIs running on the server.

A further technical benefit may be realized by using machine learning to train clustering models for the metrics information. Different organizations can have different policies for their APIs, and the machine learning clustering models can adapt to the organizations and improve understanding of the metrics information. For example, a bank API can have a larger transaction rate and have a higher rate limiting policy. The administrator can update the tags and train the machine learning clustering models with updated tags. This can provide a customer with customized tags for metrics information of the customer's specific APIs.

FIG. 1 illustrates a block diagram of an exemplary environment 100 for implementing automatic microgateway taxonomy tags, in accordance with some embodiments. As illustrated in FIG. 1, environment 100 can include API users 102-1 and API users 102-2 (collectively referred to as API users 102), customer 104, API 110, API microgateways 112-1 to 112-n (collectively referred to as API microgateways 112), servers 114-1 to 114-n (collectively referred to as servers 114), and database 116.

API users 102 may be individuals or computer programs accessing API 110 managed by customer 104. For example, API users 102 may be members of a business, organization, or other suitable group that are accessing the API using suitable computing systems, such as mobile devices and laptops shown in FIG. 1. One skilled in the relevant arts will appreciate the wide range of computer applications that may access a provided API. API users 102 may access API 110 using a personal digital assistant, desktop workstation, laptop or notebook computer, netbook, tablet, smart phone, mobile phone, smart watch or other wearable, appliance, part of the Internet-of-Things, and/or embedded system, to name a few non-limiting examples, or any combination thereof. API users 102 may be human beings, but API users 102 may also be artificial intelligence constructs or other computer systems programmatically accessing API 110. API users 102 may employ, i.e., connect to, a network or combination of networks including the Internet, a local area network (LAN), a wide area network (WAN), a wireless network, a cellular network, or various other types of networks as would be appreciated by a person of ordinary skill in the art.

Customer 104 may be an administrator or other individual monitoring and managing API 110 using API microgateways 112. Customer 104 may be a member of a business, organization, or other suitable group. Customer 104 may be a human being, but customer 104 may also be an artificial intelligence construct. In some embodiments, customer 104 can manage API 110 and API microgateways 112 with an API management system. In some embodiments, customer 104 can manage API 110, API microgateways 112, servers 114, and database 116 with the API management system. Customer 104 may connect to the API management system using a personal digital assistant, desktop workstation, laptop or notebook computer, netbook, tablet, smart phone, mobile phone, smart watch or other wearable, appliance, part of the Internet-of-Things, and/or embedded system, to name a few non-limiting examples, or any combination thereof. Customer 104 may employ, i.e., connect to, a network or combination of networks including the Internet, a local area network (LAN), a wide area network (WAN), a wireless network, a cellular network, or various other types of networks as would be appreciated by a person of ordinary skill in the art.

In an embodiment, API 110 represents resources stored in database 116 and can be a unique URL to the resources. API 110 can accept API requests to provide services to API users 102. API 110 can be a conceptual abstraction having multiple instances running in multiple servers 114, allowing horizontal scaling. Depending on the architecture of servers 114, each server may receive different amounts of API requests. Also, the traffic of API requests to API 110 may vary over time, depending on the necessity of each of API users 102. One skilled in the art will appreciate that many such services and use cases exist given the wide range of APIs and API architectures employed by organizations. Moreover, while only one API 110 is displayed in FIG. 1, this is done merely for simplicity of explanation. One skilled in the arts will recognize that many arrangements exist having multiple APIs and multiple instances of each API to accommodate a far-ranging variety of additional use cases.

API microgateways 112 may be a dedicated orchestration layer resting atop of API 110 and providing an additional abstraction layer in front of the actual APIs to separate orchestration concerns from implementation concerns. API microgateways 112 may be configured to receive any incoming requests and provide corresponding responses between API users 102 and API 110. API microgateways 112 may apply throttling, security, caching, and logging to API 110. API microgateways 112 may authenticate and route API requests to instances of API 110 running in servers 114. API microgateways 112 may enforce rate limiting, throttling, and other service level agreements. API microgateways 112 may implement encryption and access control. API microgateways 112 may use policies to enforce these various regulations related to security, traffic control, authentication, access, and service level access. API microgateways 112 can collect metrics information while processing API requests on an ongoing basis and aggregate the metrics information and send the aggregated metrics information in an access log to customer 104. In some embodiments, API microgateways 112 can automatically labelling the metrics information with tags determined by a machine learning clustering model. The tags can indicate a current status of API 110 and API microgateways 112 and provides more insight to customer 104 for monitoring.

Servers 114 can be implemented as one server or can be distributed as any suitable number of servers, as illustrated in FIG. 1. For example, multiple servers 114 can be implemented in various locations to increase reliability, function of the application, and/or the speed at which the server can process the API request for API 110. In some embodiments, servers 114 could also be a cloud based computing system. As referred to herein, a server may include a hardware and/or software framework dedicated to the execution of procedures (e.g., programs, routines, scripts). In some embodiments, servers 114 may be implemented using computer system 700 as further described with reference to FIG. 7.

API 110 running in servers 114 can access database 116 to respond to API requests. As used herein, the term "database" refers to an organized collection of data. In some embodiments, a database may include a plurality of data tables comprising data values (e.g., alphanumeric strings, integers, decimals, floating points, dates, times, binary values, Boolean values, and/or enumerations). Some examples of databases include columnar databases, relational databases, key-store databases, graph databases, and document stores.

Figure 2:
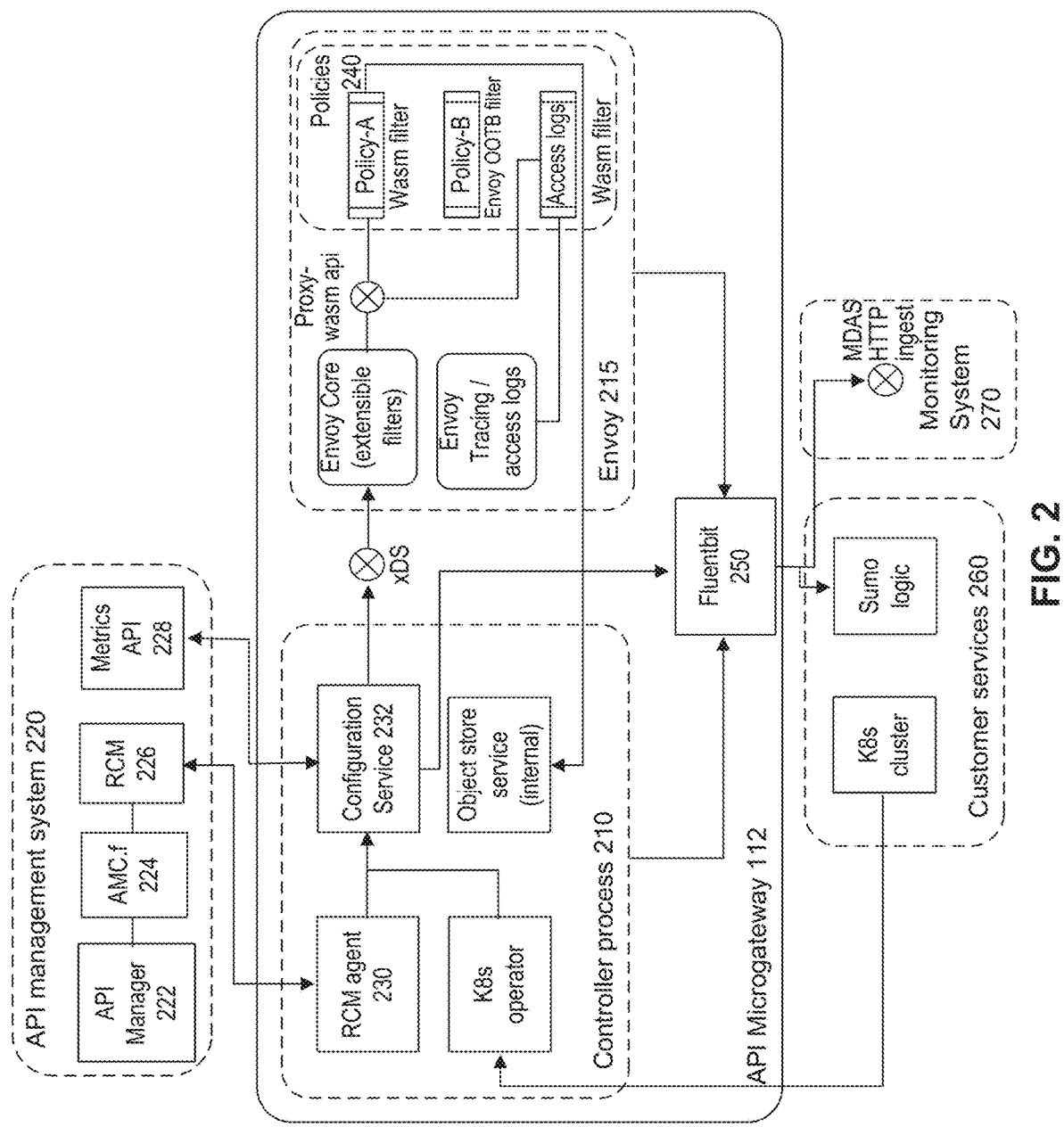
FIG. 2 illustrates an exemplary architecture for an API microgateway to implement automatic microgateway taxonomy tags, in accordance with some embodiments.

FIG. 2 illustrates an exemplary architecture 200 for API microgateway 112 to implement automatic microgateway taxonomy tags, in accordance with some embodiments. In some embodiments, API microgateway 112 is capable of being managed online connected with API management system 220, such as Anypoint Platform by MuleSoft.

In some embodiments, API microgateway 112 may be implemented as a stock Envoy distribution accompanied by two processes: (1) A "sidecar process" that manages APIs and policies configuration and translates it to the necessary Envoy configuration, either by connecting to the platform or reading configuration files, and (2) a Fluentbit log forwarder process. In accordance with some embodiments, the name Envoy is used as an exemplary REST-based API to build integrations, although one skilled in the relevant arts will appreciate that other implementations may be used.

In some embodiments, API manager 222, such as Anypoint API Manager, can configure and monitor API microgateway 112 through the AMC framework (AMC.f) 224. API microgateway 112 can be connected to remote connections manager (RCM) 226 in API management system 220 using secure websocket channels. Authentication and authorization can be managed through X.509 certificates.

In some embodiments, RCM agent 230 in controller process 210 can communicate with the RCM 226 in API management system 220 and exchanging configuration and status messages, such as keep-alive notifications, API and policy deployments, and runtime configuration changes. These configuration and status messages are then consumed by configuration service 232. Configuration service 232 can translate configuration information that specifies APIs and policies in a generic format into Envoy configuration and communicate with envoy 215. In some embodiments, configuration service 232 communicates with envoy 215 through standard xDS APIs. Metrics API 228 can communicate with configuration service 232 about configuration information of API microgateway 112.

In some embodiments, configuration service 232 can collect internal usage metrics for API microgateway 112. Policies 240 can define triggering conditions specified by customer 104 for API 110. For example, policy A can define a rate limiting policy for API 110 instance 1 to allow 1000 requests per minute and policy B can define a rate limiting policy for API 110 instance 2 to allow 100 requests per minute. Runtime API metrics information can be obtained using a filter in policies 240 to improve the metrics with data specific to API 110, such as API identification and policy-related behavior (e.g., violations). Fluentbit 250 can route access logs and metrics to customer services 260 and monitoring system 270. For example, Anypoint monitoring center can integrate standard Fluentbit HTTP outputs.

In some embodiments, policies 240 in envoy 215 can be implemented using a proxy-wasm extension interface. This allows envoy 215 to host potentially proxy-portable implementations of WebAssembly (wasm) modules that implement network-proxy-related logic, such as MuleSoft policies for Authn/z, and Rate Limiting. Out-of-the-box policies (e.g., policy-B) may be included in API microgateway 112 when first implemented. In some embodiments, policy versions can be tied to runtime versions, and policy upgrades can imply runtime upgrades. RCM 226 provides a message with a link for downloading the custom-policy binary code. RCM agent 230 downloads the binary code, and configuration service 232 can consume the configuration of the binary code created at runtime.

Figure 3:
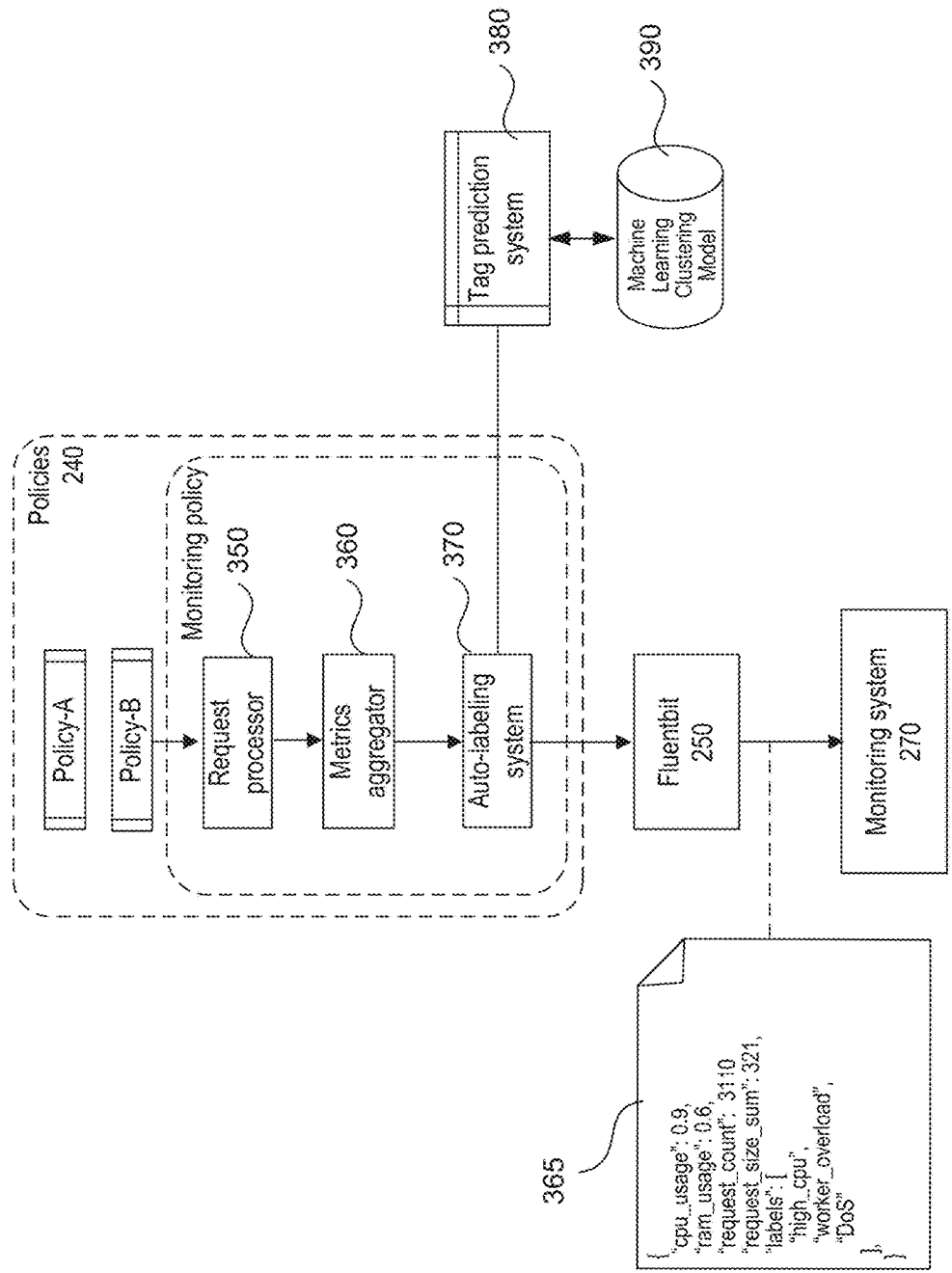
FIG. 3 illustrates a block diagram of monitoring exemplary policies with automatic microgateway taxonomy tags, in accordance with some embodiments.

FIG. 3 illustrates a block diagram 300 of monitoring exemplary policies 240 with automatic microgateway taxonomy tags, in accordance with some embodiments. In some embodiments, API microgateway 112 can implement automatic microgateway taxonomy tags with a wasm-based envoy filter and generate access logs including tags associated with aggregated metrics information. As shown in FIG. 3, diagram 300 can include request processor 350, metrics aggregator 360, tag prediction system 380, and machine learning clustering model 390 to automatically labeling metrics information aggregated in a period of time with a tag. In some embodiments, request processor 350 can process the API requests and route them to instances of API 110.

Metrics aggregator 360 can aggregate metrics information during processing of the API requests. In some embodiments, the metrics information can include request features, response features, policy features, and performance features. The request features for an API request can include a method of the request, a request size, a content type of the request, and a security status of the request. The response features of a response to an API request can include a response time, a response size, a security status, a content type of the response, and a security status of the response. The policy features for a policy of API 110 can include a status of the policy and a policy violation. The performance features can include a CPU usage, a memory usage, an input/output (I/O) usage, a network input, and a network output during processing of the API requests. The breadth of the available metrics will be understood by one skilled in the relevant arts, particularly the wide-array of metrics typically used to monitor the performance and behavior of software applications. Auto-labeling system 370 can use these metrics information including request features, response features, policy features, and performance features to automatically label the metrics information with a tag. The tag can indicate a current status of API 110 and API microgateways 112.

Tag prediction system 380 can predict one or more tags for the aggregated metrics information based on machine learning clustering model 390. In some embodiments, machine learning clustering model 390 can use a clustering based semi-supervised machine learning for classification. Machine learning clustering model 390 can fit the aggregated metrics information to a cluster and identify any tags for the cluster. In some embodiments, machine learning clustering model 390 can include out-of-the-box common tags for the metrics information during processing API requests. In some embodiments, customer 104 can add new tags or change existing tags to update machine learning clustering model 390.

In some embodiments, the tags in machine learning clustering model 390 can include security attacks, such as a DoS attack, an injection attack. In some embodiments, the tags can include misconfigured gateways, such as policies not activated, gateway resources misconfigured. In some embodiments, the tags can include auto-scaling spikes, such as a spike detection, an I/O overload, and an auto-scaling failure. The breadth of the available tags will be understood by one skilled in the relevant arts, particularly the wide-array of performance and behavior of environment 100. Auto-labeling system 370 can associate the tags to the metrics information and add them into access log messages. The log messages including the tag and the metrics information can be sent through fluentbit 250 to monitoring system 270.

For example, as shown in FIG. 3, the aggregated metrics information in access log 365 can include a CPU usage of 90%, a ram usage of 60%, a request count 3110, and a sum of request size 321. According to machine learning clustering model 390, tag prediction system 380 can predict tags for a cluster of the aggregated metrics information. As shown in FIG. 3, the tags for the aggregated metrics information include "high_CPU," "worker_overload," and "DoS." Customer 104 can monitor the metrics information and tags with monitoring system 270. Comparing to log messages including just the metrics information, log messages with tags and the metrics information can provide customer 104 during runtime insight about the status and performance of API 110, API microgateways 112, and servers 114. Customer 104 can take appropriate actions according to the tags. For example, customer 104 can scale up API instances for a spike of API requests from API users 102. In another example, customer 104 can quickly isolate instances of API 110 for a DoS attack and mitigate damage to servers 114 running the API and damage to other APIs running on servers 114.

Figure 4:
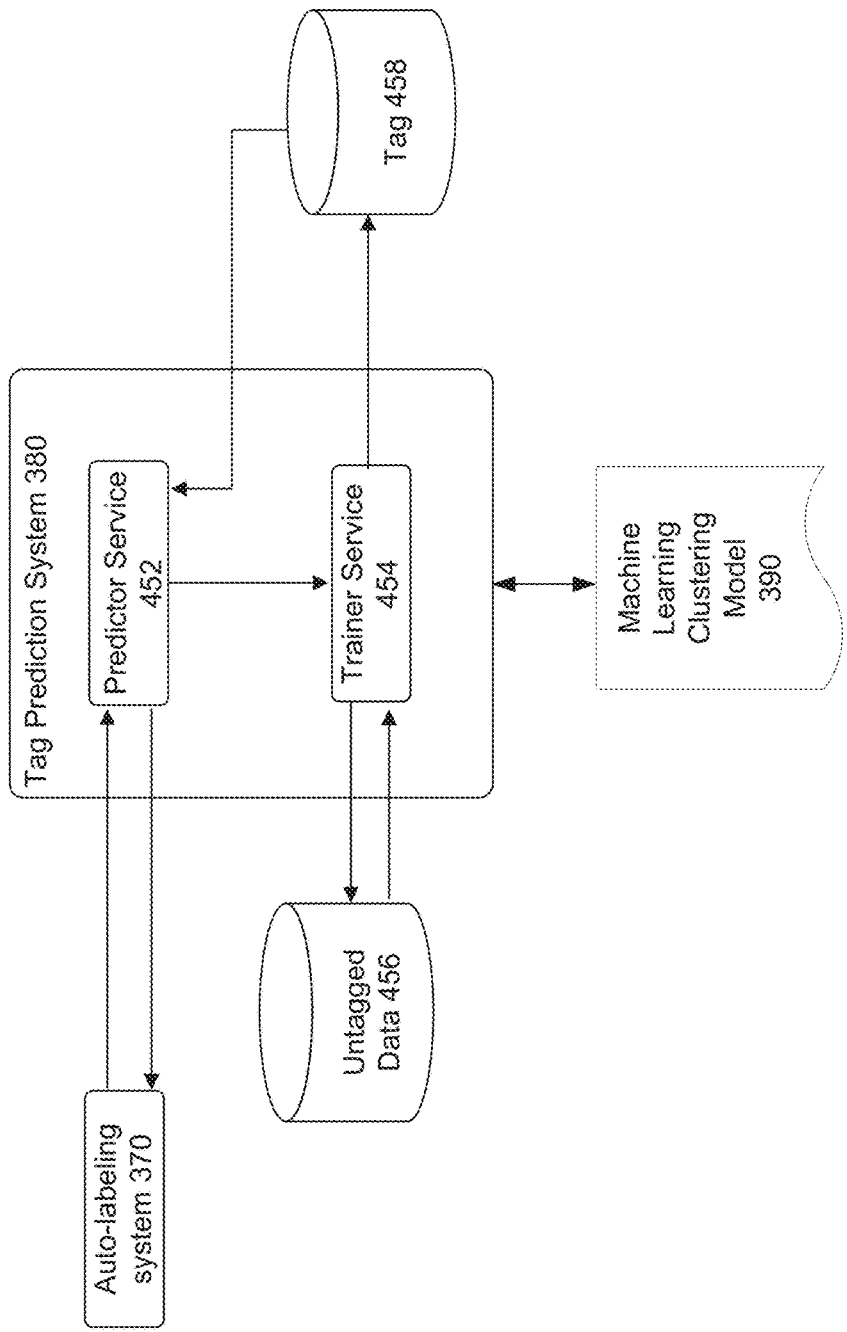
FIG. 4 illustrates a block diagram of an exemplary tag prediction system for automatic microgateway taxonomy tags, in accordance with some embodiments.

FIG. 4 illustrates a block diagram 400 of exemplary tag prediction system 380 for automatic microgateway taxonomy tags, in accordance with some embodiments. In some embodiments, block diagram 400 illustrates details to predict tags for aggregated metrics information in tag prediction system 380. As shown in FIG. 4, tag prediction system 380 can include predictor service 452 and trainer service 454.

Predictor service 452 can receive the aggregated metrics information from auto-labeling system 370. The aggregated metrics information can include request features, response features, policy features, and performance features as described above. Predictor service 452 can fit the aggregated metrics information to a cluster using the machine learning clustering model 390 and identify any tags for the cluster. The tags of machine learning cluster model 390 can be stored in tag 458. In some embodiments, tag 458 can include security attacks, misconfigured gateways, and auto-scaling spikes as described above to indicate issues with API 110, API microgateways 112, and servers 114. In some embodiments, tag 458 can include request-response to indicate a normal status of API 110 and API microgateways 112.

Machine learning clustering model 390 can identify tags for clusters corresponding to the aggregated metrics information. Machine learning clustering model 390 may use the request features, response features, policy features, and performance features to build the clusters and tag the clusters. In addition, machine learning clustering model 390 can adapt to performance and behavior of various organizations and can update according to performance and behavior changes. For example, machine learning clustering model 390 can deploy a neural network and train the neural network over time based on aggregated metrics information of various organizations. Compared with configuring a particular metric with a threshold, machine learning clustering model 390 can improve the accuracy to identify potential issues during processing API requests and reduce response time to solve the issues. Customer 104 can have better insight of the process to monitor API 110 and API microgateways 112.

In some embodiments, customer 104 can update the tags in tag 458. For example, after reviewing a tag of spike detection and corresponding metrics information, customer 104 may find that this is normal increase of visits to a URL and customer 104 may update the tag name to a normal status. In some embodiments, customer 104 can update policies in API microgateways 112. For example, after reviewing a tag of DoS attack and corresponding metrics information, customer 104 may notice it is a false alert and update the rate limiting policy of API 110. Customer 104 may also update the configuration of API microgateway 112 and route API requests to other instances of API 110. In addition, customer 104 can scale up additional instances of API 110 for an increasing number of API requests.

In some embodiments, machine learning clustering model 390 may have no corresponding tags for the aggregated metrics information. Trainer service 454 can store the aggregated metrics information in untagged data 456 and trigger a training process. Customer 104 can review the aggregated metrics information and assign customer tags to the untagged aggregated metrics information. Trainer service 454 can receive the customer tags for the aggregated metrics information from customer 104. Trainer service 454 can train machine learning clustering model 390 with the customer tags and the cluster of the aggregated metrics information. Machine learning clustering model 390 is updated after the training process and can predict tags for similar aggregated metrics information. In this way, predictor service 452 can act as a rule-based engine applying the customer tags on aggregated metrics information based on constraints specified by customer 104. In some embodiments, the customer tag for a cluster of aggregated metrics information can have a higher priority than automatically generated tags for the cluster of aggregated metrics information.

Figure 5A:
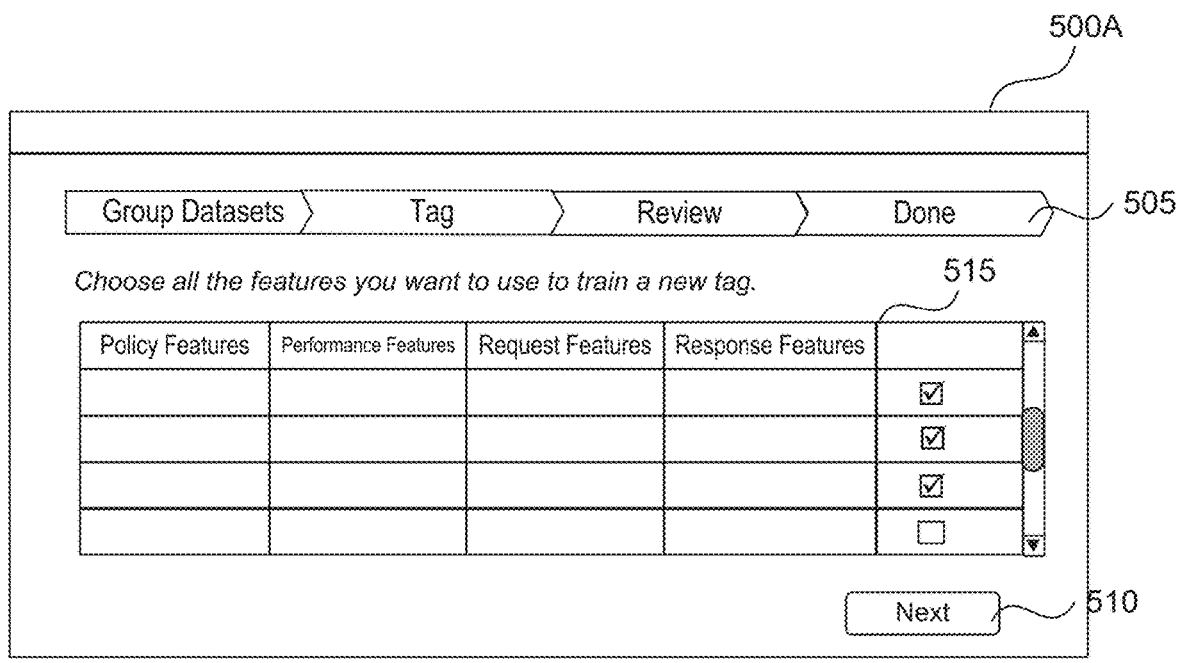
FIGS. 5A-5D illustrate example screen displays of a training process for automatic microgateway taxonomy tags, in accordance with some embodiments.

FIGS. 5A-5D illustrate example screen displays 500A-500D of a training process for automatic microgateway taxonomy tags, in accordance with some embodiments. The screen displays provided in FIGS. 5A-5D are merely exemplary, and one skilled in the relevant art(s) will appreciate that many approaches may be taken to provide suitable screen displays 500A-500D in accordance with this disclosure. As illustrated in FIG. 5A, screen display 500A can include status bar 505, metrics table 515, and button 510.

In some embodiments, status bar 505 can indicate the status of the training process. Customer 104 can group datasets, tag the grouped datasets, review the tag, and finish the training process. Metrics table 515 can include policy features, performance features, request features, and response features as described. Customer 104 can select a combination of the metrics in metrics table 515 to assign a tag. Button 510 can navigate the training process to next steps.

Figure 5B:
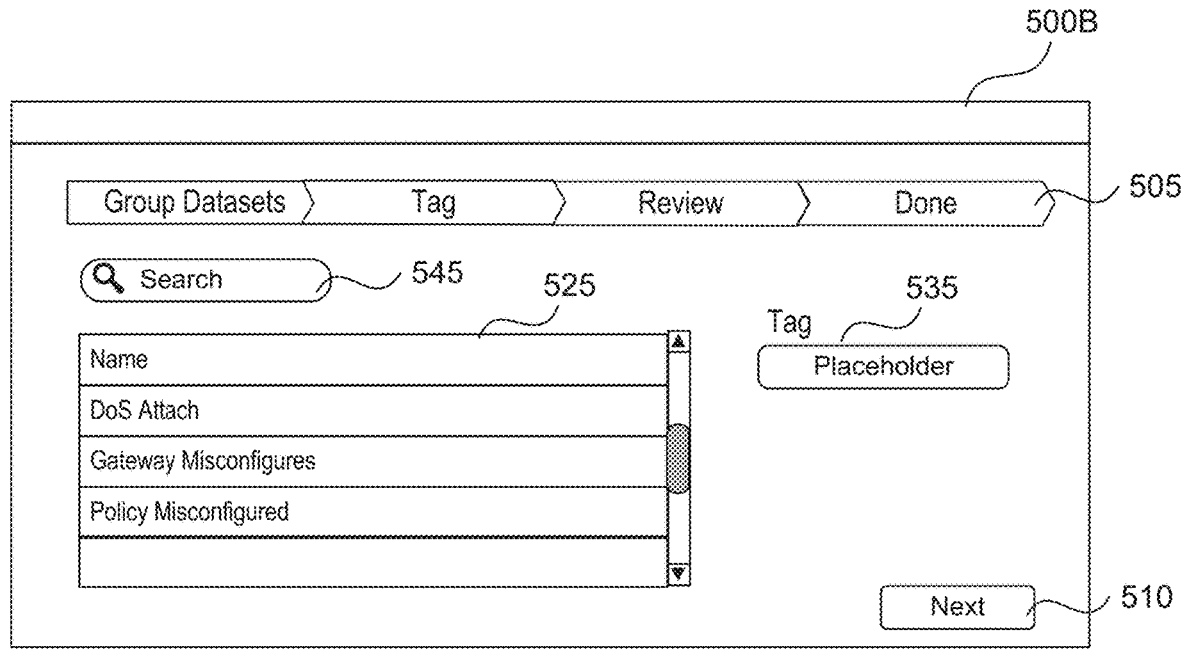

As illustrated in FIG. 5B, screen display 500B can include a list of tag names 525, selected tag 535, search bar 545 in addition to components displayed in FIG. 5A. Customer 104 can search for a tag name using search bar 545 and select a tag name in the list of tag names 525. The selected tag name can be displayed in selected tag 535.

Figure 5C:
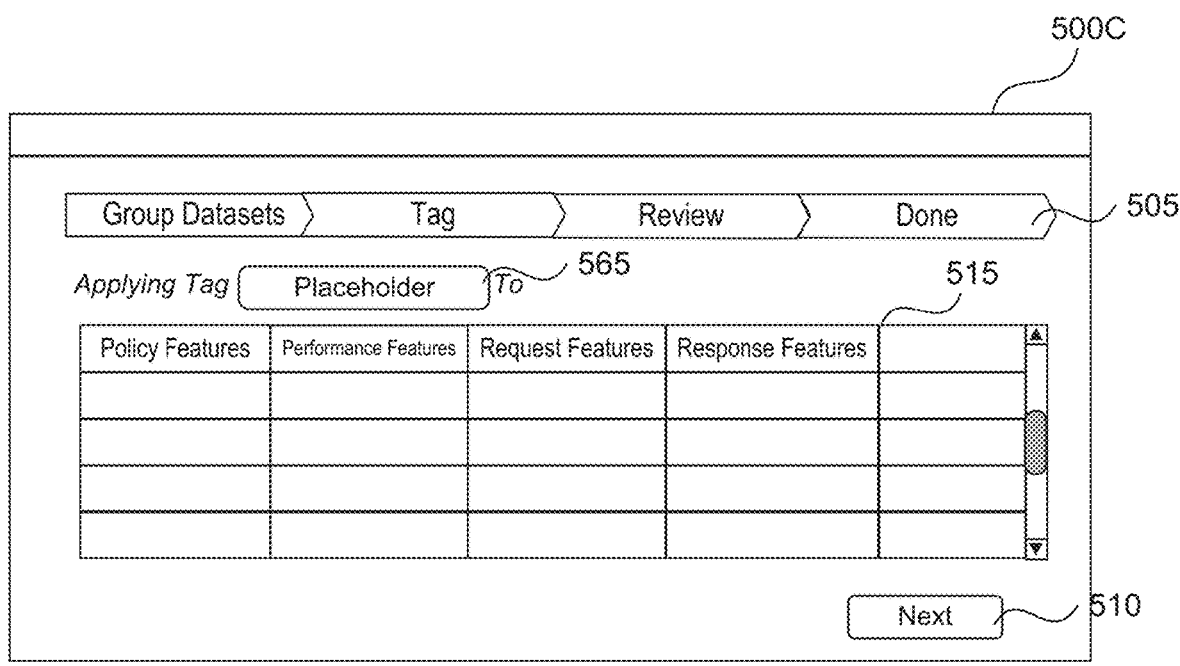
Figure 5D:
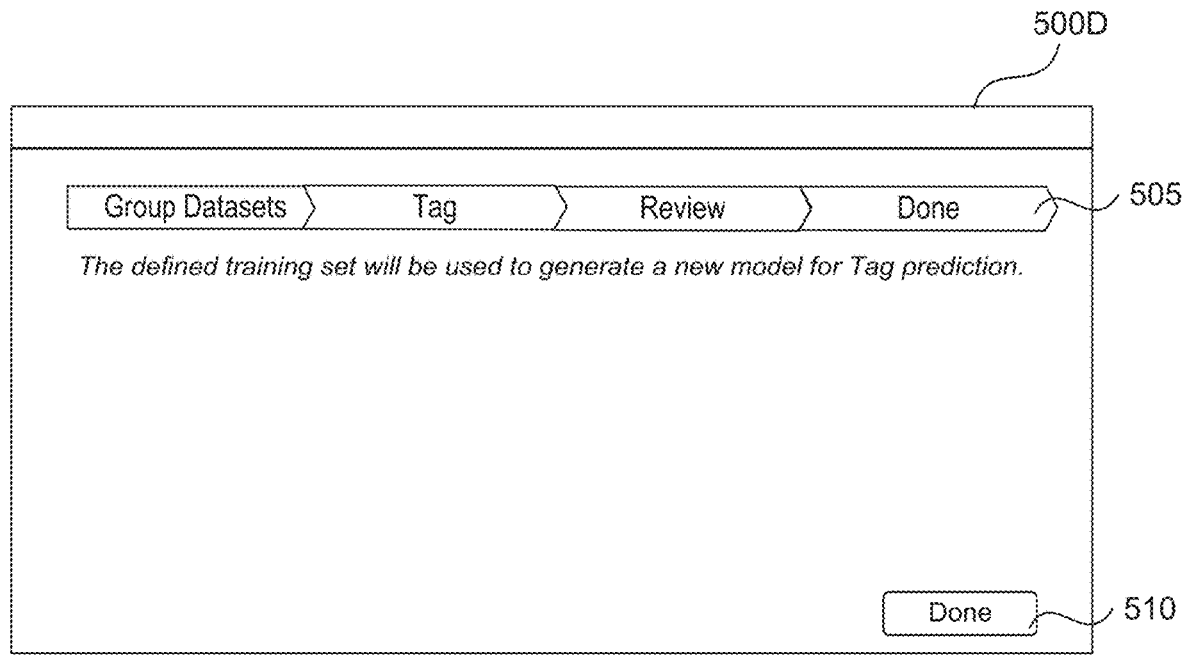

After tagging the selected combination of metrics, as illustrated in FIG. 5C, customer 104 can review the tags in screen display 500C. Box 565 can have the selected tag as shown in selected tag 535. Customer 104 can check the selected tag in box 565 and the selected metrics in metrics table 515. After review, as illustrated in FIG. 5D, customer 104 can click button 510 in screen display 500D to finish the training process. Machine learning clustering model 390 is updated after the training process and include the selected tag for selected combination of metrics. Machine learning clustering model 390 can use the customer selected tag for tag prediction of future metrics information.

Figure 6:
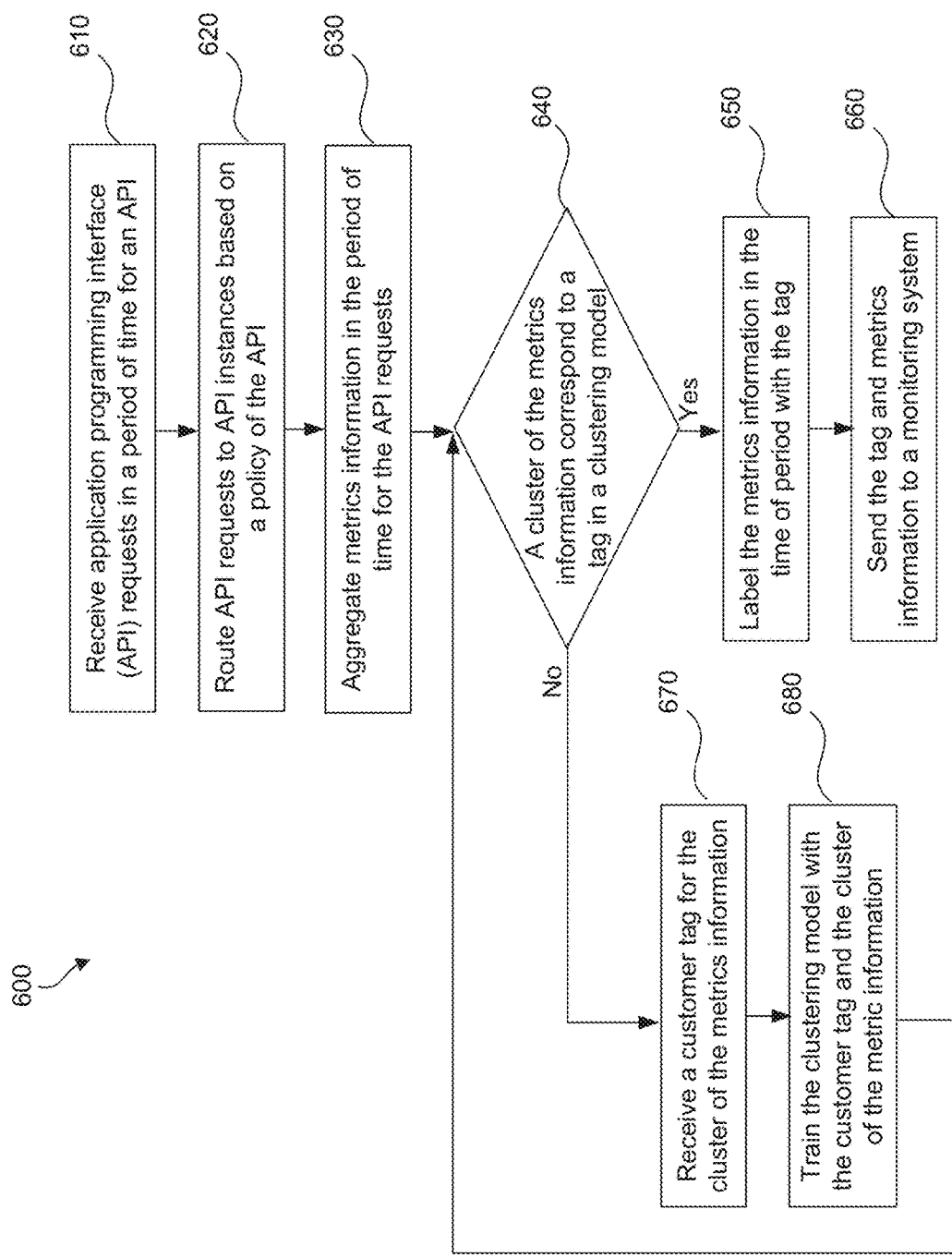
FIG. 6 illustrates a flowchart diagram of an exemplary method for implementing automatic microgateway taxonomy tags, in accordance with some embodiments.

FIG. 6 illustrates a flowchart diagram of an exemplary method 600 for implementing automatic microgateway taxonomy tags, according to some embodiments. Method 600 can be described with reference to FIGS. 1-4 and 5A-5D; however, method 600 is not limited to the example embodiment. In some embodiments, API microgateways 112 may utilize method 600 to automatically labelling aggregated metrics information in a period of time with machine learning clustering model 390. While method 600 is described with reference to API microgateways 112 in environment 100, method 600 may be executed on any computing device, such as, for example, the computer system described with reference to FIG. 7 and/or processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art(s).

In 610, multiple API requests are received for an API in a period of time. For example, as shown in FIG. 1, API microgateways 112 can receive multiple API requests for API 110 from API users 102. API users 102 may access API 110 for services or resources provided through API 110.

In 620, the API requests are routed to API instances based on a policy of the API. For example, as shown in FIGS. 1 and 2, API microgateways 112 can route API requests to API instances in servers 114 based on policies 240. Policies 240 can define a triggering condition specified by customer 104 for instances of API 110. For example, policy A can define a rate limiting policy for API 110 instance 1 to allow 1000 requests per minute and policy B can define a rate limiting policy for API 110 instance 2 to allow 100 requests per minute. If API 110 instance 2 already receives 100 requests per minute, API microgateways 112 can route additional API requests to API 110 instance 1. As shown in FIG. 3, request processor 350 can process and route the API requests.

In 630, metrics information in the period of time can be aggregated for the multiple API requests. For example, as shown in FIG. 3, metrics aggregator 360 can aggregate metrics information during processing of the API requests. In some embodiments, the metrics information can include request features, response features, policy features, and performance features as described above. In some embodiments, the metrics information can include statistics of API 110, API microgateways 112, servers 114, and database 116.

In 640, API microgateways 112 may determine if a cluster of the metrics information correspond to a tag in a clustering model. If yes, method 600 may proceed to 650 to label the aggregated metrics information with the tag. If not, method 600 may proceed to 670 to trigger a training process. For example, as shown in FIGS. 3 and 4, auto-labeling system 370 can send the aggregated metrics information to tag prediction system 380 to predict one or more tags for the aggregated metrics information.

In 650, the metrics information in the time of period is labeled with the tag. For example, as shown in FIGS. 3 and 4, predictor service 452 can receive the aggregated metrics information from auto labeling system 370. Predictor service 452 can fit the aggregated metrics information to a cluster using the machine learning clustering model 390 and identify any tags in tag 458 for the cluster. Predictor service 452 can send the identified tags to auto-labeling system 370. Auto-labeling system 370 can label the aggregated metrics information with the identified tags.

In 660, the tag and the metrics information are sent to a monitoring system. For example, as shown in FIG. 3, the aggregated metrics information and the tag can be added to an access log and the log messages can be sent to monitoring system 270. Customer 104 can access monitoring system 270 and check the tags for the current status of API 110 and API microgateways 112 during processing of API requests. In some embodiments, customer 104 can monitor the tags in a user interface (UI). The UI can show customer 104 current status of API 110 and API microgateways 112 without the details of the metrics information.

In 670, a customer tag for the cluster of the metrics information can be received from customer 104. For example, as shown in FIG. 4, trainer service 454 can store the aggregated metrics information in untagged data 456 and trigger a training process. Trainer service 454 can receive customer tags for the aggregated metrics information from customer 104. In some embodiments, auto-labeling system 370 may not label any tag for the aggregated metrics information. The aggregated metrics information is added to the access log without any tags and sent to monitoring system 270 through fluentbit 250. Customer 104 can assign customer tags to the aggregated metrics with no tags when reviewing the access log.

In 680, the clustering model is trained with the customer tag and the cluster of the metrics information. For example, as shown in FIG. 4, trainer service 454 can train machine learning clustering model 390 with the customer tags and the aggregated metrics information. Machine learning clustering model 390 is updated after the training process and can predict customer tags for future aggregated metrics information.

With machine learning clustering model 390, the taxonomy of the tags for aggregated metrics information can be identified automatically. Customer 104 can monitor API 110, API microgateways 112, servers 114, and database 116 with the tags during processing the API requests. With additional information and insight provided by the tags, customer 104 can take quick actions for potential security issues, policy violations, and performance trends to mitigate damage and improve user experience.

Figure 7:
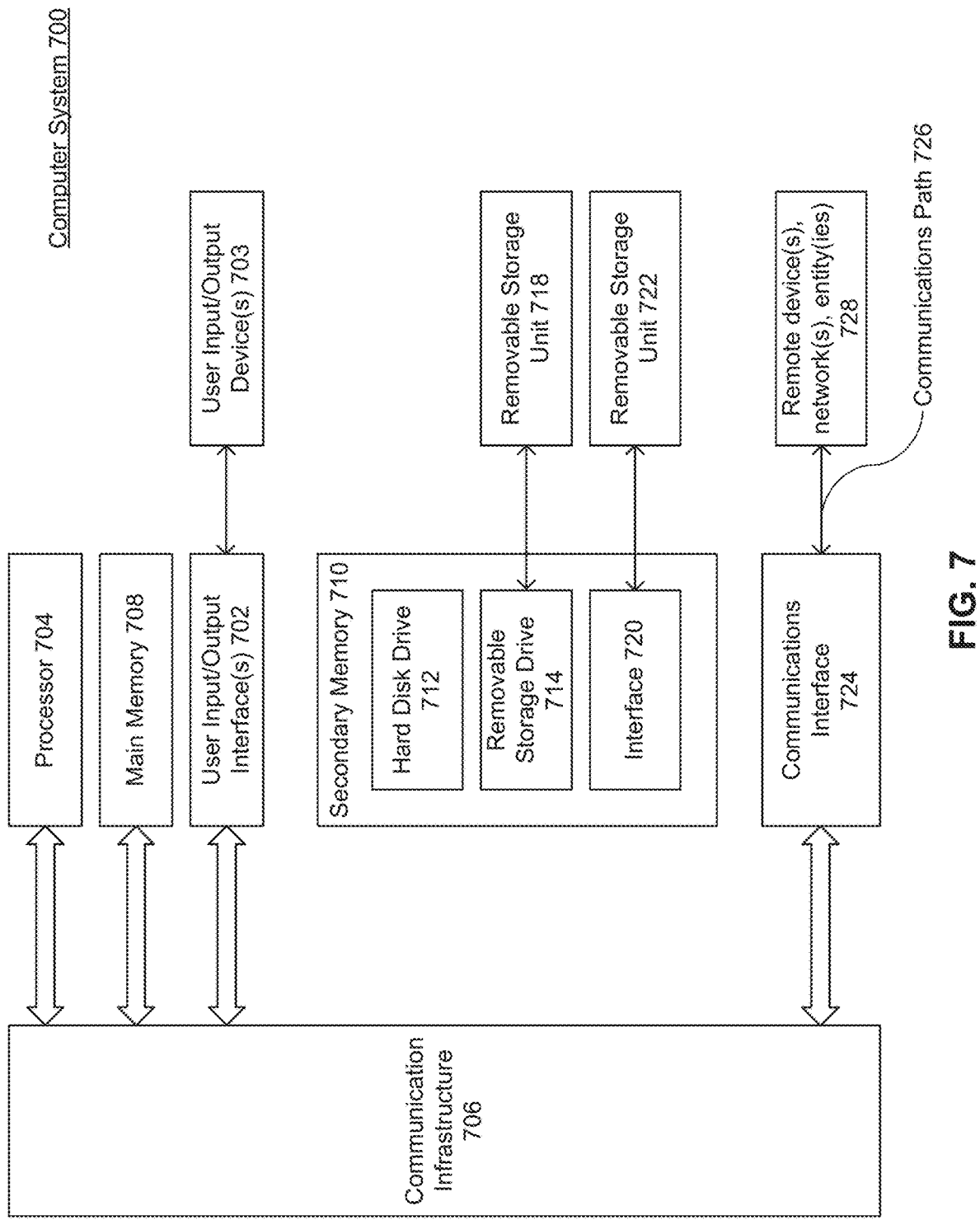
FIG. 7 illustrates an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 708, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
receiving via an application programming interface (API) microgateway, a plurality of API requests for an API in a period of time, the API being monitored by a monitoring system,
routing the plurality of API requests to an instance of the API in response to a violation of a rate limiting policy of the API, wherein the rate limiting policy defines a triggering condition specified for the API and wherein the triggering condition includes a threshold number of API requests in the period of time for the instance of the API;
aggregating metrics information related to the plurality of API requests, wherein the metrics information includes statistics of the plurality of API requests, responses to the plurality of API requests, the violation of the rate limiting policy, and performance statistics to process the plurality of API requests;
fitting the metrics information to a cluster using a clustering model;
labelling, in response to the cluster corresponding to a tag in a tag prediction system, the metrics information with the tag, wherein the tag indicates a current status of the API and the API microgateway; and
sending the tag and the corresponding metrics information for the API and the API microgateway to the monitoring system.

2. The method of claim 1, further comprising updating the rate limiting policy of the API according to feedback relating to the tag based on the metrics information.

3. The method of claim 1, further comprising updating the tag for the cluster of the metrics information in the tag prediction system according to feedback relating to the tag based on the metrics information.

4. The method of claim 1, further comprising adding an additional instance of the API to respond to the plurality of API requests.

5. The method of claim 1, further comprising storing the tag and the metrics information in an access log.

6. The method of claim 1, in response to the cluster of the metrics information corresponding to no tag in the tag prediction system, further comprising:
receiving a customer tag for the cluster of the metrics information;
training the tag prediction system with the customer tag and the cluster of the metrics information; and
associating the customer tag with the cluster of the metrics information.

7. The method of claim 1, wherein the metrics information includes a satisfaction of the triggering condition, a memory usage, and a CPU usage for the instance of API in the period of time and wherein the tag for the cluster of the metrics information includes a denial-of-service attack.

8. A system, comprising:
a memory; and
at least one processor coupled to the memory and configured to:
receive, via an application programming interface (API) microgateway, a plurality of API requests for an API in a period of time, the API being monitored by a monitoring system;
route the plurality of API requests to an instance of the API in response to a violation of a rate limiting policy of the API, wherein the rate limiting policy defines a triggering condition specified for the API and wherein the triggering condition includes a threshold number of API requests in the period of time for the instance of the API;
aggregate metrics information related to the plurality of API requests, wherein the metrics information includes statistics of the plurality of API requests, responses to the plurality of API requests, the violation of the rate limiting policy, and performance statistics to process the plurality of API requests;
fit the metrics information to a cluster using a clustering model;
label, in response to the cluster corresponding to a tag in a tag prediction system, the metrics information with the tag, wherein the tag indicates a current status of the API and the API microgateway; and
send the tag and the corresponding metrics information for the API and the API microgateway to the monitoring system.

9. The system of claim 8, the at least one processor further configured to update the rate limiting policy of the API according to feedback relating to the tag based on the metrics information.

10. The system of claim 8, the at least one processor further configured to update the tag for the cluster of the metrics information in the tag prediction system according to feedback relating to the tag based on the metrics information.

11. The system of claim 8, the at least one processor further configured to add an additional instance of the API to respond to the plurality of API requests.

12. The system of claim 8, the at least one processor further configured to store the tag and the metrics information in an access log.

13. The system of claim 8, in response to the cluster of the metrics information corresponding to no tag in the tag prediction system, the at least one processor further configured to:
receive a customer tag for the cluster of the metrics information;
train the tag prediction system with the customer tag and the cluster of the metrics information; and
associate the customer tag with the cluster of the metrics information.

14. The system of claim 8, wherein the metrics information includes a satisfaction of the triggering condition, a memory usage, and a CPU usage for the instance of the API in the period of time and wherein the tag for the cluster of the metrics information includes a denial-of-service attack.

15. A non-transitory computer-readable device having instructions stored thereon that, when executed by at least one computing device, causes the at least one computing device to perform operations comprising:
receiving, via an application programming interface (API) microgateway, a plurality of API requests for an API in a period of time, the API being monitored by a monitoring system;
routing the plurality of API requests to an instance of the API in response to a violation of a rate limiting policy of the API, wherein the rate limiting policy defines a triggering condition specified for the API and wherein the triggering condition includes a threshold number of API requests in the period of time for the instance of the API;
aggregating metrics information related to the plurality of API requests, wherein the metrics information includes statistics of the plurality of API requests, responses to the plurality of API requests, the violation of the rate limiting policy, and performance statistics to process the plurality of API requests;
fitting the metrics information to a cluster using a clustering model;
labelling, in response to the cluster corresponding to a tag in a tag prediction system, the metrics information with the tag, wherein the tag indicates a current status of the API and the API microgateway; and
sending the tag and the corresponding metrics information for the API and the API microgateway to the monitoring system.

16. The non-transitory computer-readable device of claim 15, the operations further comprising updating the rate limiting policy of the API according to feedback relating to the tag based on the metrics information.

17. The non-transitory computer-readable device of claim 15, the operations further comprising updating the tag for the cluster of the metrics information in the tag prediction system according to feedback relating to the tag based on the metrics information.

18. The non-transitory computer-readable device of claim 15, wherein the metrics information includes a satisfaction of the triggering condition, a memory usage, and a CPU usage for the instance of the API in the period of time and wherein the tag for the cluster of the metrics information includes a denial-of-service attack.

19. The non-transitory computer-readable device of claim 15, the operations further comprising storing the tag and the metrics information in an access log.

20. The non-transitory computer-readable device of claim 15, in response to the cluster of the metrics information corresponding to no tag in the tag prediction system, the operations further comprising:
receiving a customer tag for the cluster of the metrics information;
training the tag prediction system with the customer tag and the cluster of the metrics information; and
associating the customer tag with the cluster of the metrics information.

* * * * *

UNITED STATES PATENT AND TRADEMARK OFFICE
CERTIFICATE OF CORRECTION

PATENT NO. : 12,373,187 B2
APPLICATION NO. : 17/587512
DATED : July 29, 2025
INVENTOR(S) : Saint Esteben et al.

Page 1 of 1

It is certified that error appears in the above-identified patent and that said Letters Patent is hereby corrected as shown below:

In the Claims

In Column 13, Claim 1, Line 50, delete "system," and insert -- system; --, therefor.

Signed and Sealed this
Second Day of September, 2025

Coke Morgan Stewart
*Acting Director of the United States Patent and Trademark Office*